(12) United States Patent
Boney et al.

(10) Patent No.: US 6,938,693 B2
(45) Date of Patent: Sep. 6, 2005

(54) METHODS FOR CONTROLLING SCREENOUTS

(75) Inventors: Curtis L. Boney, Houston, TX (US); Matthew J. Miller, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/227,690

(22) Filed: Aug. 26, 2002

(65) Prior Publication Data

US 2003/0106690 A1 Jun. 12, 2003

Related U.S. Application Data

(60) Provisional application No. 60/334,703, filed on Oct. 31, 2001.

(51) Int. Cl.$^7$ .................. E21B 43/267; E21B 43/26
(52) U.S. Cl. .................. 166/280.1; 166/308.1; 166/283; 166/300; 507/924; 507/203
(58) Field of Search .................. 166/282, 283, 166/308, 300, 292, 308.1, 308.2, 280.1; 507/923, 922, 203, 924

(56) References Cited

U.S. PATENT DOCUMENTS

| | | | | |
|---|---|---|---|---|
| 4,109,721 A | * | 8/1978 | Slusser ............... | 166/280 |
| 5,036,919 A | * | 8/1991 | Thomas et al. ....... | 166/271 |
| 5,095,987 A | * | 3/1992 | Weaver et al. ....... | 166/276 |
| 5,211,859 A | * | 5/1993 | Horton et al. ....... | 507/211 |
| 5,301,751 A | * | 4/1994 | Githens et al. ...... | 166/283 |
| 5,325,921 A | * | 7/1994 | Johnson et al. ...... | 166/280 |
| 5,330,005 A | | 7/1994 | Card et al. .......... | 166/280 |
| 5,439,055 A | | 8/1995 | Card et al. .......... | 166/280 |
| 5,447,199 A | * | 9/1995 | Dawson et al. ....... | 166/300 |
| 5,501,275 A | | 3/1996 | Card et al. .......... | 166/280 |
| 5,551,516 A | | 9/1996 | Norman et al. ....... | 166/308 |
| 5,558,161 A | * | 9/1996 | Vitthal et al. ....... | 166/280.1 |
| 5,582,250 A | * | 12/1996 | Constien ............. | 166/280.1 |
| 5,633,220 A | * | 5/1997 | Cawiezel et al. ..... | 507/117 |
| 5,782,300 A | | 7/1998 | James et al. ........ | 166/278 |

(Continued)

OTHER PUBLICATIONS

Dynamic Fluid Loss in Hydraulic Fracturing Under Realistic Shear Conditions in High–Permeability Rocks—Navarrete, R.C., Caweizel, K.E. and Constein, V.G., pp138–143 (Aug. 1996).

Fracturing Unconsolidated Sand Formations Offshore Gulf of Mexico—SPE 24844, F.L. Monus, F.W. Broussard, J.A. Ayoub and W.D. Norman.

Screenless Tip–Screenout Fracturing: A Detailed Examination of Recent Experience—SPE 71653, Y. Fan, M.D. Looney, and J.A. Jones.

U.S. Appl. No. 10/214,817, filed Aug. 8, 2002, Dean Willberg.

M. Economides and K. Nolte, eds., *Reservoir Stimulation*, 3$^{rd}$ Edlition, John Wiley & Son, Ltd, New York (2000) pp 10–21 to 10–24.

*Primary Examiner*—David Bagnell
*Assistant Examiner*—Shane Bomar
(74) *Attorney, Agent, or Firm*—Thomas O. Mitchell; Tim Curington; Robin Nava

(57) ABSTRACT

Methods are presented to induce a screenout during a subterranean formation fracturing or combined fracturing and gravel packing treatment by laying down a filter cake early in the treatment, then injecting proppant slurry, and then while proppant slurry injection continues chemically damaging the filter cake with one or more filter cake degradation agents so that leak-off increases, the concentration of proppant in the fracture increases, and the proppant screens out. The additional use of filter cake degradation agent aids and bridging-promoting materials is included.

33 Claims, 5 Drawing Sheets

U.S. PATENT DOCUMENTS

| | | | |
|---|---|---|---|
| 5,964,295 A | 10/1999 | Brown et al. | 166/308 |
| 5,979,555 A | 11/1999 | Gadberry et al. | 166/270.1 |
| 5,979,557 A | 11/1999 | Card et al. | 166/300 |
| 6,110,875 A * | 8/2000 | Tjon-Joe-Pin et al. | 507/201 |
| 6,138,760 A * | 10/2000 | Lopez et al. | 166/300 |
| 6,140,277 A | 10/2000 | Tibbles et al. | 507/201 |
| 6,165,947 A * | 12/2000 | Chang et al. | 507/216 |
| 6,209,643 B1 * | 4/2001 | Nguyen et al. | 166/276 |
| 6,216,783 B1 * | 4/2001 | Hocking et al. | 166/250.1 |
| 6,258,859 B1 | 7/2001 | Dahayanake et al. | 516/77 |
| 6,380,138 B1 * | 4/2002 | Ischy et al. | 507/204 |
| 6,443,227 B1 * | 9/2002 | Hocking et al. | 166/250.1 |
| 6,488,091 B1 * | 12/2002 | Weaver et al. | 166/300 |
| 6,569,814 B1 * | 5/2003 | Brady et al. | 507/201 |
| 6,605,570 B2 * | 8/2003 | Miller et al. | 507/211 |
| 2003/0166471 A1 * | 9/2003 | Samuel et al. | 507/200 |

* cited by examiner

METHODS FOR CONTROLLING SCREENOUTS

REFERENCE TO RELATED PROVISIONAL APPLICATION

This application claims the benefit of provisional application No. 60/334,703 filed Oct. 31, 2001.

TECHNICAL FIELD OF THE INVENTION

This Invention relates to increasing the flow of fluids into or out of subterranean wells. More particularly it relates to stimulation of the flow of fluids from the rock of a formation into a wellbore. Most particularly it relates to methods of controlling the size and shape, location, and quality of fractures created in hydraulic fracturing (either conventional or with coiled tubing), or in fracturing and gravel packing in one operation, or in gravel packing.

BACKGROUND OF THE INVENTION

Hydraulic fracturing, gravel packing, or fracturing and gravel packing in one operation, are used extensively to stimulate the production of hydrocarbons, water and other fluids from subterranean formations. These operations involve pumping a slurry of "proppant" in hydraulic fracturing (natural or synthetic materials that prop open a fracture after it is created) or "gravel" in gravel packing. In high permeability formations, the goal of a hydraulic fracturing treatment is typically to create a short, wide, highly conductive fracture, in order to bypass near-wellbore damage done in drilling and/or completion, to ensure good communication between the rock and the wellbore and to increase the surface area available for fluids to flow into the wellbore. Gravel is also a natural or synthetic material, which may be identical to, or different from, proppant. Gravel packing is used for "sand" control. Sand is the name given to any particulate material, such as clays, from the formation that could be carried into production equipment. Gravel packing is a sand-control method used to prevent production of formation sand, in which a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

It is very undesirable to allow the proppant or gravel to pack the wellbore above the producing formation. If this happens, the wellbore must be cleaned out to permit various other downhole operations, such as placement of tools, to permit optimal fluid production. It is also very undesirable if the operation screens out too late or not at all, that is if the fracture keeps growing, in length and/or in height, beyond what is necessary and desired, and an optimal pack and desired fracture size and shape are never generated to maximize production and to prevent flowback of proppant or sand.

As mentioned, short, wide fractures are often desired. The most common method of creating short-wide fractures is to initiate a tip screenout during the pumping operation. In a tip screenout, the solids concentration at the tip of the fracture becomes so high due to fluid leak-off into the formation that the slurry is no longer mobile. The concentrated proppant slurry plugs the fracture, and prevents additional fracture growth. Additional pumping of the proppant/fluid slurry into the formation after the screenout causes the fracture to grow wider, and large concentrations of proppant per surface area are placed in the fracture. The design of these treatments relies heavily on knowing the correct mechanical properties, permeability, reservoir pressure and fluid saturations of the formation being treated. Prior to most of these treatments a small fracturing treatment (sometimes called a "data frac" or "mini-frac") is performed in order to measure these properties and to determine the formation's response to a hydraulic fracturing treatment. Treatment designs are often modified on the fly to incorporate this new information. Important design parameters are the size of the pad, the size and number of stages, and the proppant or gravel concentration in each subsequent stage, and the nature of the fluid and additives used in each stage. Treatment design and modification is typically done with the aid of a computer model, many of which are available in the industry.

The pad is the proppant-free fluid pumped to initiate and propagate a fracture before stages including proppant or gravel are started. It typically serves another purpose as well. It lays down a coating, called a "filter cake", on the faces of the forming fracture. This filter cake reduces the flow of fluid from the fracture into the formation (affecting the "efficiency" of the job (see below)). The filter cake may be formed from the viscosifying agents that are normally present, such as polymers. The filter cake may also be formed by adding additional materials to the fluid for that purpose, especially if the pores in the fracture face are large. Such optionally added materials in this use are often called fluid loss control additives, or FLA's.

In hydraulic fracturing, in particular in low permeability formations where the longest possible fracture is desired (in order to create the largest possible fracture face for flow of fluids into the fracture and ultimately into the wellbore), modes of operation that might induce a tip screenout are typically avoided, in order to achieve long, conductive fractures. If a tip screenout is encountered in such a fracturing operation before the entire designed treatment is pumped, as inferred from an increase in pumping pressure, the pump rate is reduced or most likely the treatment is stopped and considered a failure. We will call hydraulic fracturing job designs and job executions in which a tip screenout is not desired and does not occur, "conventional" hydraulic fracturing.

On the other hand, sometimes tip screenouts are desired. Design features typically employed in those special situations in which a tip screenout is desired typically involve methods of ensuring that fluid leak-off is high relative to the rate and amount of proppant injection. This can be achieved by using a small pad, using little or no fluid loss additive, using higher proppant concentrations earlier in the treatment, pumping more slowly, and other methods known to those skilled in the art of fracturing and combined fracturing/gravel packing.

Unfortunately, in spite of data-fracturing information, the pressure transients collected by downhole pressure gauges during treatments indicate that TSO's do not occur in many, perhaps the majority, of the treatments in which they are desired and intended. The fluid at the tip of the fracture remains mobile, the fracture tip continues to grow throughout the treatment and the desired proppant concentration in the fracture is not reached. Therefore, the desired fracture conductivity is not obtained. Often, TSO's have to be coaxed by lowering pump rates or increasing proppant concentrations when the TSO is desired.

There are two principal reasons for not achieving an appropriate TSO. First, the fracture may be too large for the proppant volume. This occurs a) when the pad is too large or b) when the "efficiency" is too high, or c) when the ratio of proppant volume to slurry volume selected in the design of the job is not high enough. (The "efficiency" in a fracturing operation is high when fluid leak-off is controlled—either naturally by the properties of the fluid and the matrix, or by the addition of fluid loss control additives—to an acceptably low level; efficiency is low when leak-off is high, so that very large volumes of fluid must be pumped in order to generate the intended fracture size and shape and to place a specified amount of proppant or gravel.) Second, the fracture width may be too great for the proppant to form a bridge in the fracture. This may be due to bad initial design (for example in choice of proppant diameter) or to width growth beyond what was expected.

Up until now, besides designing the job better, the major way to deal with these problems was directed towards optimizing the choice of fluid loss control additive or additives and the stages of the job in which they were used, especially if the main problem was that the fracture was too large for the proppant volume.

Fibers are used in fracturing to control proppant flowback. In that case, fiber is added at an optimal concentration to control proppant flowback, while not significantly impacting fracture conductivity. If one is using glass fibers, for example, this concentration is approximately 1 weight per cent by weight of the proppant. This concentration is insufficient to cause bridging during pumping under the conditions at which it is normally employed, especially in low permeability formations. Fibers are also used sometimes to aid in transport of proppant when the viscosity of the fluid is very low. Tip screenout is commonly deliberately avoided in these treatments; proppant concentrations are kept low through careful pre-treatment job design, especially in careful selection of pumping schedules. For example, in these treatments the pad volume is increased over conventional job designs to ensure that sufficient fracture width is generated prior to the proppant/fiber slurry entering the fracture. However, U.S. patent application Ser. No. 10/214,817 (assigned to Schlumberger Technology Corporation, filed Aug. 8, 2002, hereby incorporated in its entirety by reference) describes a method of deliberately using fibers to enhance tip screenout when desired.

The ability to achieve success in obtaining TSO's is very uncertain in significant part due to the fact that the true nature of the subterranean formation is unknown and variable. It would be highly desirable if a method were available to induce a TSO when needed that depends more upon features of the job under the operator's control (especially the chemistry of the fluids and fluid loss control additives used) than on the unknown variability of the formation. There is a need for a more reliable way to ensure that intended tip screenouts will occur and to allow for more flexibility in design of tip screenout treatments.

SUMMARY OF THE INVENTION

One embodiment of the Invention is a method of causing a screenout, during stimulation of a subterranean formation by propped fracturing, by forming a filter cake and then degrading the filter cake with a filter cake degradation agent while injecting proppant slurry into the fracture. In some embodiments the filter cake is formed from the viscosifier for the carrier fluid in the slurry or from a fluid loss additive or both. In some embodiments the filter cake degradation agent may be an oxidizer, an enzyme, an acid or mixtures of these. Another embodiment is a method of causing a screenout in a subterranean formation stimulation treatment, including injecting a slurry of a proppant in a carrier fluid above fracturing pressure to create one or more fractures, the method including the steps of injecting a pad fluid that forms a filter cake; injecting one or more first slurry stages comprising a proppant in a carrier fluid; and degrading the filter cake with a filter cake degradation agent while injecting one or more second slurry stages comprising a proppant in a carrier fluid. In other embodiments of this method, the pad fluid includes one or more than one of fluid loss additives, filter cake degradation agents, filter cake degradation agent aids, and mixtures thereof, provided that no filter cake degradation agent aid is included for a filter cake degradation agent that is included; the one or more first slurry stages include one or more than one of fluid loss additives, filter cake degradation agents, filter cake degradation agent aids, and mixtures thereof, provided that no filter cake degradation agent aid is included for a filter cake degradation agent that is included or was in the pad; and the one or more second slurry stages include one or more than one of filter cake degradation agents, filter cake degradation agent aids, and mixtures thereof. In another embodiment, the pad fluid and the one or more first slurry stages each include a fluid loss additive, a first filter cake degradation agent and a filter cake degradation agent aid for a second filter cake degradation agent that is more active under treatment conditions than is the first filter cake degradation agent; and the one or more second slurry stages contain the second filter cake degradation agent. In another embodiment, the filter cake includes a polymer subject to enzymatic and oxidative degradation under treatment conditions; the first filter cake degradation agent is present in the pad and includes an enzyme that degrades the polymer; the second filter cake degrading agent is present in the one or more second slurry stages and includes an oxidizing compound that degrades the polymer; and the second filter cake degradation agent aid for the second filter cake degradation agent is present in the pad fluid, the one or more first slurry stages, and the one or more second slurry stages and is a tertiary amine. In another embodiment the filter cake includes an acid-soluble solid particulate compound and the second filter cake degrading agent is present in the one or more second slurry stages and includes an acid capable of dissolving at least part of the acid-soluble solid particulate compound under treatment conditions. In another embodiment one or more of the pad fluid, the one or more first slurry stages, and the one or more second slurry stages include a bridging-promoting material. In a preferred embodiment, the filter cake includes a polymer subject to enzymatic and oxidative degradation under treatment conditions; the first filter cake degradation agent is present in the pad and includes an enzyme that degrades the polymer; the second filter cake degrading agent is present in the one or more second slurry stages and includes an oxidizing compound that degrades the polymer; the second filter cake degradation agent aid for the second filter cake degradation agent is present in the pad fluid, the one or more first slurry stages, and the one or more second slurry stages and is a tertiary amine; and at least some of the one or more first slurry stages contain a bridging-promoting material. In other embodiments, a sand control screen is in place before the treatment. In other embodiments, the treatment is a combined fracturing/gravel packing treatment.

DETAILED DESCRIPTION OF PREFERRED EMBODIMENTS

Figure 1:
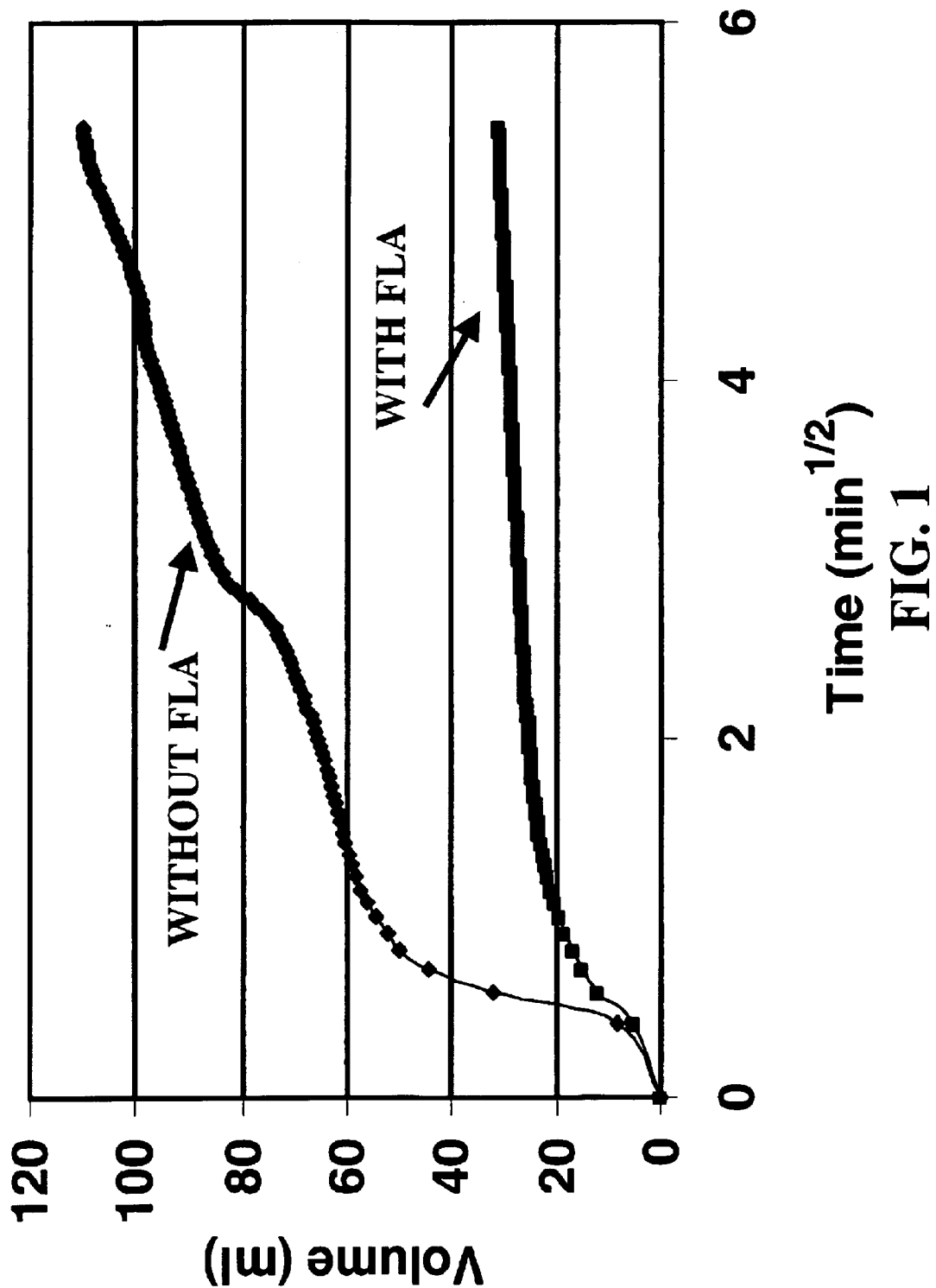
FIG. 1 shows typical fluid leak-off volume data with and without a fluid loss additive.

To aid in understanding deliberate tip screenouts promoted by job design in hydraulic fracturing and combined fracture/gravel packing operations, see M. Economides and K. Nolte, eds., *Reservoir Stimulation*, $3^{rd}$ edition, John Wiley & Sons, Ltd, New York (2000) pp 10–21 to 10–24; and F. L. Monus, F. W. Broussard, J. A. Ayoub and W. D. Norman, "Fracturing Unconsolidated Sand Formations Offshore Gulf of Mexico," SPE 24844, (1992). We have now found ways to bring about screenouts in a fracture deliberately and in a controlled manner by manipulation of the composition of the injected fluids. One method is particularly effective when the failure to screen out is due to the fracture being too large for the proppant volume; this method is to form a filter cake and then to reduce the amount of filter cake, or increase its permeability, at the appropriate time. We will use the term filter cake degradation to encompass reducing the amount of filter cake or increasing its permeability by breaking or dissolving at least a portion of at least one of the components of the filter cake. This is done, for example, by breaking or dissolving the filter cake during the job with one or more appropriate breakers or dissolvers, which we will term filter cake degradation agents, sometimes with an additional breaker or dissolver aid, which we will term a filter cake degradation agent aid. The breakers or dissolvers may be delayed, for example with delay agents or by encapsulation. When the fracture is too large for the proppant volume, one or more breakers or dissolvers may be added throughout the job or at least in the pad and/or early stages of the job.

Other methods are particularly effective when the failure to screen out is due primarily to the fracture being too wide for the proppant to bridge. An example is to reduce the efficiency in the later stages of the job by adding an appropriate breaker, sometimes with a breaker aid, in the later stages of the job, or by adding more breaker or a better breaker in the later stages of the job. In this embodiment, breaker may not have been used in the pad or in the early proppant stages. These breakers are effective when the filter cake's resistance to fluid flow results primarily from polymers in the fluid or in the FLA.

If the filter cake's resistance to fluid flow results primarily from calcium carbonate or one or more other acid-soluble materials in the FLA, the filter cake can be dissolved by adding acid to the later stages.

Another method is to add fibers or other materials (termed bridging-promoting materials) with the proppant to assist in bridging, in conjunction with one of the above methods of breaking or dissolving the filter cake.

The methods involving breaking or dissolving the filter cake and adding fibers can be combined, simultaneously or consecutively. These methods can also be used to form wider fractures (that have grater fracture conductivity) deliberately. These methods can also be used as a form of diversion, that is the operator can deliberately stop the growth and packing of one fracture and initiate a new fracture without zonal isolation. The methods can be used to destroy the FLA throughout the fracture or only in part of it. The operator can decide and control when and where the screenout occurs (and avoid the undesirable results of failure to screen out, of very gradual and inefficient screenout, or of screenout in the wellbore above the formation) by accelerating the leak-off, optionally also by assisting bridging.

The underlying and unifying concept is that a filter cake is laid down early in the treatment, then proppant slurry is injected, and then while proppant slurry injection continues the filter cake is chemically damaged by a filter cake degradation agent so that leak-off increases, the concentration of proppant in the fracture increases, and the proppant screens out. Depending upon such factors as the reactivity under the treatment conditions (for example temperature and carrier fluid pH) of the filter cake degradation agent or agents used, the thickness of the filter cake deposited (affected for example by the carrier fluid viscosity and the formation permeability) and other job design parameters such as the planned duration of the job, dimensions of the fracture, and proppant particle size, the timing of the addition of various chemicals will vary. For example, the pad must be pumped long enough and/or contain enough FLA to ensure laying down the needed filter cake. The filter cake degradation must not be so fast, or be begun so soon, that screenout occurs before it is wanted. Conversely, the filter cake degradation must not be so slow, or be begun so late, that screenout does not occur or occurs too late. Proppant addition is usually done in stages. In each stage a certain proppant concentration is injected for a certain amount of time. Successive stages usually have successively increasing proppant concentrations. The proppant concentration may also be ramped smoothly, that is increase continuously during the proppant-laden stages. To aid in description, a typical job will be broken up into the pad and two sets of proppant slurry stages. In the pad, the fracture is initiated and filter cake is laid down. In the first set of stages, the fracture is enlarged. In the second set of stages, a screenout occurs and the fracture is packed with proppant. As was said, certain other features of the job may strongly influence the timing of the addition of the chemicals. If the pad must be small, laying down of filter cake may continue in all of, or the early stages of, the first set of stages. If the filter cake degradation agent is slow acting, addition may begin even in the pad, and degradation may begin in the first set of stages. If it is very fast acting, addition may begin only in the second set of stages. Filter cake degradation agents of successively increasing reactivity may be used, or filter cake degradation agents that degrade different components of the filter cake may be used simultaneously or successively. If the filter cake degradation agent is not reactive enough a filter cake degradation agent aid may be added. That filter cake degradation agent aid may be added before or after the filter cake degradation agent is added, in such a way that both are present only in the second set of stages, or they may both be added together in the second set of stages. A bridging-promoting agent may be added in any or all of the pad and stages. One skilled in the art of subterranean formation stimulation could design treatments that generate a fracture having specific final parameters (such as dimensions and conductivity) in many different ways within the scope and spirit of the Invention, depending upon such factors as, for example, the availability of chemicals and materials; the availability and capability of the equipment with which the chemicals and materials can be added; and cost.

The Invention is preferably carried out by first considering information about the well, the formation, the fluids available, and criteria for a successful fracture stimulation, and preparing an optimized plan for maximizing stimulated well performance according to the data and the criteria. Such a design will include injection of an amount of a selected pad fluid and an amount of a selected fracture fluid. This is usually done by analyzing the well using fracturing design and evaluation software in which pressure gradients are combined with fracture length and height evolution algorithms, complete leak-off information, and the effects of multiple fluid injections and their temperature changes. For hydraulic fracturing or gravel packing, or a combination of the two, aqueous fluids for pads or for forming slurries are viscosified with polymers (usually crosslinked with a boron, zirconium or titanium compound), or with viscoelastic surfactants ("VES's") that can be formed using certain surfactants that form appropriately sized and shaped micelles. Any fracture or gravel packing fluids can be used in the Invention, provided that they are compatible with the special materials of the Invention (FLA's, fibers, breakers, breaker aids), and with the formation, the proppant, and the desired results of the treatment. Thus the fluid can for example be aqueous based or oil-based, acidic or basic, and can comprise one or more polymers, viscoelastic surfactants, or gelled oils. The polymers may be crosslinked. The methods of the Invention can be incorporated into the original job design or the job could be designed without planning a TSO and then it could be decided during the job execution that a TSO was desired and the job could be modified on the fly accordingly. (Note that in this description, we often refer to any screenout in the fracture as a tip screenout (TSO), but by TSO we mean a screenout that occurs in the fracture and not necessarily at the very end of the fracture farthest from the wellbore; what is critical is that the screenout occurs when and where it is desired and not in the wellbore.)

We shall use the term "conventional fracturing" here to refer to hydraulic fracturing in which a tip screenout is neither intended nor desired. We shall use the term "tip screenout" to mean a screenout that is in the fracture and not in the wellbore, but is not necessarily in the end of the fracture away from the wellbore. In conventional fracturing, modes of operation that might induce a tip screenout are avoided. If a tip screenout is encountered in a conventional fracturing operation, as inferred from an increase in pumping pressure, before the entire designed treatment is pumped, some change may be made on the fly in the job parameters, for example pump rate or proppant concentration, to try to minimize the tendency toward tip screenout. Frequently, however, the treatment is stopped and considered to be a failure.

The pad of the Invention comprises a carrier fluid and a viscosifying polymer or a VES. It may additionally contain other additives normally used in such fluids, provided that none of the components of the pad is deleterious to the formation or to the fracture fluid. Fluids used as the pad in the present Invention may typically contain materials such as corrosion inhibitors, friction reducers, clay stabilizers, scale inhibitors, biocides, and the like.

The carrier fluid provides a medium for the transport of the other components into the formation. Preferably, the carrier fluid is water or brine. Selected organic or inorganic salts or mixtures can be included, provided that they are compatible with all components in the pad, the fracture fluid, the formation and the formation fluids. Solutions containing from about 1 to about 7% by weight potassium chloride (KCl) or ammonium chloride are often used as the base liquid in fracturing fluids and pads to stabilize clays and prevent clay swelling. Sometimes other brines or seawater may be used. An organic cation salt, such as, in particular, tetra methyl ammonium chloride, is an effective salt, especially but not limited to about 0.2 to about 0.5 percent by weight.

Typically, if a polymer is used to viscosify the fluids, the polymer is water-soluble. Common classes of effective water-soluble polymers include polyvinyl polymers, polymethacrylamides, cellulose ethers, polysaccharides, lignosulfonates, and ammonium, alkali metal, and alkaline earth salts thereof. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinly acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar, carboxymethyl hydroxypropyl guar, and carboxymethyl guar), heteropolysaccharides obtained by the fermentation of starch-derived sugar (e.g., xanthan gum), and ammonium and alkali metal salts thereof. Preferred water-soluble polymers include hydroxyethyl cellulose, starch, scleroglucan, galactomannans, and substituted galactomannans.

The optimal polymer concentration can be determined by choosing the desired leak-off parameters and measuring leak-off with samples of the intended fluids and of the formation or of a rock similar to the formation. Leak-off is defined by three terms: "spurt", which is the initial rapid leak-off of fluid before a filtercake barrier is formed on the fracture face and is measured in gallons/100 square feet, and, for the subsequent leak-off that occurs even after a filtercake is formed and is governed by the viscosity and the wall-building propensity: Cw, the wall-building fluid loss coefficient, and Cv, the viscosity controlled fluid loss coefficient. Cw is not applicable where there is no wall-building material present. Cv is not applicable where there is a low, finite Cw. Cw and Cv are measured in $ft/min^{1/2}$. Preferred values of spurt, Cw and Cv respectively are 0 to about 5, about 0.001 to about 0.05, and about 0.001 to about 0.05; more preferred values are 0 to about 2, about 0.001 to about 0.008, and about 0.001 to about 0.008; most preferred values are 0 to about 1, about 0.001 to about 0.003, and about 0.001 to about 0.003. The values of these parameters (and the actual behavior they represent) can vary significantly provided that a suitable filter cake is produced in an appropriate time. A test method for determining these values is given in Navarrete, R. C., Caweizel, K. E., and Constien, V. G.: "Dynamic Fluid Loss in Hydraulic Fracturing Under Realistic Shear Conditions in High-Permeability Rocks," SPE Production and Facilities, pp 138–143 (August, 1996).

Any VES based fluid can be used, in or after the pad, that is compatible with the formation, the formation fluids, and any additives. Particularly effective fluids are those described in U.S. Pat. Nos. 5,551,516; 5,964,295; 5,979,555; 5,979,557; 6,140,277; and 6,258,859, all hereby incorporated by reference. Breakers may also be used for VES's.

Since the methods of the Invention work primarily by the properly timed and located destruction or weakening of a filter cake, the pad and/or the proppant carrying stages preferably also contain a fluid loss control additive or additives to form a suitable filter cake. If they do not contain polymeric materials that can form a suitable filter cake, for example if the fracturing pad and/or carrier fluid are viscosified with a VES, then the pad and/or the proppant carrying stages must contain a fluid loss control additive or additives to form a suitable filter cake. Fluid loss additives can be, by non-limiting example, water-soluble polymers or crosslinked water-soluble polymers. If the pad and/or proppant laden fluids are viscosified with a polymer or crosslinked polymer, the FLA may be the same or a different polymer or crosslinked polymer. The amount needed to viscosify the carrier fluid may be adequate or more may be added to form an appropriate filter cake. FLA's can also be solids such as asbestos, granular starch, calcium carbonate (calcite), particulate mica, plastic particles, solid wax or wax-polymer particles, solid oil-soluble resin particles, insoluble salts, slowly soluble salts (such as sodium chloride if the carrier fluid and formation water have high ionic strengths), and mixtures thereof. The FLA must contain at least one component that can be broken or degraded (for example oxidation of a polymer, or enzymatic degradation of a cross-linked natural polymer) or dissolved (for example dissolution of calcium carbonate by an acid, or dissolution of a wax or resin by a solvent).

The Invention is carried out by determining, sometimes first by experiment and usually finally by computer simulation and modeling, the optimal amounts of FLA and breaker or breakers (optionally with breaker aid) or dissolver (such as acid), and the stages in which they should be included so that the filter cake breaks or dissolves at the desired time and place. One skilled in the art of stimulation of subterranean wells and formations can readily do this with a knowledge of the chemicals and conditions (especially time and temperature) involved. The process can be done for example by adjusting the chemistry and/or the job pumping design or both, including iteratively, usually by modeling until the desired result is predicted. We will call the materials used to break or dissolve filter cakes and/or FLA's "filter cake degradation agents". In some embodiments an FLA may not have been added and the filter cake may have been formed by the viscosifying agent only. In other embodiments, for example when the fluid is viscosified with a VES, the filter cake may have been formed entirely from the FLA or FLA's. In one preferred embodiment, the pad, and optionally the first proppant-laden stages, contain a first breaker and a breaker aid (which could for example be a catalyst) for a second breaker. Subsequent stages contain the second breaker. The breakers and breaker aids can be solids or liquids, and can be delayed (for example by encapsulation). Intermediate stages could contain both breakers or both breakers plus the breaker aid for the second breaker, or only the second breaker and its breaker aid. Thus the filter cake already contains a breaker aid for the second breaker when the second breaker contacts the filter cake. Thus, the various stages of the job (pad, early proppant stages, late proppant stages) can contain various combinations of FLA, different breakers, and breaker aids for the different breakers. A breaker aid could be pumped before, with, or after the breaker for which it is active. A material that forms a filter cake will always be in the pad, either the viscosifying agent (polymer or crosslinked polymer) or an added FLA. Breaker does not necessarily have to be in the pad, especially if the temperature is high enough for at least some natural degradation to occur. Similarly, an FLA does not necessarily have to be in all of the proppant-containing stages, or any of the proppant-containing stages, if a satisfactory filter cake has already been formed. All of these methods are counter to normal practice, in which it is desirable to maintain fluid efficiency as high as possible until the stimulation job is done.

If the filter cake is to be degraded by dissolution of a component (such as but not limited to calcium carbonate), this can be done by using an acid in the polymer, crosslinked polymer, or VES (all of which are known in the art in combination with acids) in the appropriate stage or stages. Appropriate acids are any acids known in the art for dissolving carbonates, such as, but not limited to, mineral acids like hydrochloric acid, hydrofluoric acid, and mixtures of the two. Organic acids, such as, but not limited to formic acid, acetic acid, fluoboric acid, and citric acid, can also be used, in conjunction with the mineral acids or separately. Additional materials, such as chelating agents, may be used to enhance the dissolution by the acid. Non-limiting examples are aminopolycarboxylic acids such as ethylenediamine tetraacetic acid, diethylenetriamine pentaacetic acid, and mixtures thereof.

This use of acids to dissolve the filter cake during a fracturing job is opposite to what is normally done in conventional fracturing, in which removal of the filter cake during the job is undesirable. For example, there are known methods for acid fracturing in which pad and acid stages are alternated. Each pad stage contains an FLA or polymer or emulsion that forms a filter cake that blocks off regions of the matrix that have already been etched by the acid (or in which wormholes have formed) and diverts the acid to a portion of the matrix that has not previously been attacked by the acid. In such applications, filter cake removal by the acid is undesirable.

It is normally desirable for the filter cake to degrade after stimulation applications in order to reduce the fracture face "skin" damage and to provide maximal flow of fluids from the matrix into the fracture and ultimately into the wellbore. This degradation normally occurs naturally, albeit slowly, by thermal processes, or by dissolution of the filter cake in typical slurry fluids, or by physical processes, in particular due to the reversal of flow (during the treatment flow is out of the fracture and into the formation, and after production begins the flow is out of the formation and into fracture). Filter cake degradation agents have not been used previously to induce very rapid filter cake degradation during hydraulic fracturing treatments. Because deliberate degradation of the filter cake by the methods of the Invention can bring about much faster degradation, it brings about much faster increase in fluid production rates.

If the use of fibers is also planned to aid in inducing a TSO, the fiber is usually in at least the first proppant stages and the concentration is chosen so that the fiber/proppant slurry packs off (is no longer mobile) and causes a TSO when the degradation of the filter cake has proceeded to the point where the fluid efficiency is less than for example about 20%. Note that the amount of fiber needed to cause a TSO in the methods of this Invention can be less than the amount of fiber normally used in fracturing to prevent proppant flowback without causing a TSO because in the methods of this Invention, other steps are taken to degrade the filter cake and increase the concentration of the fiber/proppant slurry in the fracture. In other words, bridging is promoted by deliberately enhancing the leak-off. On the other hand, the amount of fiber used may also be more than that normally used for preventing proppant flowback.

The treatment is performed in the usual way with the usual equipment, chemicals, and personnel, but with the equipment modified to give the ability to add fiber, or other bridging-promoting material, if that ability is not already present and if one of the embodiments to be used involves the addition of fiber. Methods of adding fiber are described in U.S. Pat. Nos. 5,501,275; and 5,782,300. A preferred, but not limiting, method of adding fiber is to add it to the fluid at the same time as the addition of the proppant. Although we have used the term "fiber," other materials could also be used as bridging-promoting materials, such as needles, fibrillated fibers, platelets, and ribbons, especially materials with aspect ratios greater than about three. Any organic or inorganic, natural or synthetic, material is suitable that would decrease the mobility of a fluid/proppant slurry as it dewaters. Fibers with aspect ratios greater than about three would be more effective when mixed with proppants because they would tend to leave a proppant pack with a greater permeability.

Fiber, or other bridging-promoting material, may be added in a sufficiently high concentration to induce a tip screenout, as described in U.S. Patent Application "Methods and Fluid Compositions Designed to Cause Tip Screenouts," Dean M Willberg and Curtis L. Boney, filed Aug. 8, 2002, hereby incorporated by reference, serial number not yet assigned, which has a common assignee as the present application. However, bridging-promoting materials need not be added in an amount sufficient to cause a tip screenout in the present Invention, when they are used. The densities of fibers, proppants and fluids each can vary, so the amount of fiber that will be high enough to induce a tip screenout, alone or in conjunction with a filter cake degradation agent, depends upon the specific choices of fibers, proppants and fluids. The following discussion will be in terms of aqueous liquids and preferred fibers of the Invention, synthetic organic polymeric fibers having relatively low densities of from about 1 to about 1.5 grams/cubic centimeter. However, denser fibers, such as those made from inorganic materials such as glass or ceramics, can also be used; such fibers will have densities of up to double or more the densities of synthetic organic polymeric fibers. The amount of fiber in a liquid/fiber/proppant slurry necessary to induce a tip screenout when used in conjunction with a filter cake degradation agent is most closely related to the volume of fiber per volume of fiber/proppant mixture. Thus the amounts of fiber expressed below should be adjusted for the densities of the specific components involved. The higher the density of the fiber, the higher the necessary weight concentration. Also, the aspect ratio, the length, and the diameter of the fiber relative to the diameter of a proppant will affect the amount of fiber (expressed in weight per cent of liquid in the slurry) in a liquid/fiber/proppant slurry necessary to induce a tip screenout. A lower weight per cent of fiber (expressed in weight per cent of liquid in the slurry) will be necessary as the fiber diameter is decreased or the fiber length or aspect ratio are increased. These adjustments are well within the ability of those skilled in the art. Particularly suitable, but not limiting, fibers and other materials are described in U.S. Pat. Nos. 5,330,005; 5,439,055; 5,501,275; and 5,782,300, which are hereby incorporated by reference.

What we term "fibers" can be any fibrous material, such as natural organic fibers, synthetic organic fibers (by non-limiting example polyaramide or polyamide or novoloid or a novoloid-type polymer), fibrillated synthetic organic fibers, glass fibers, carbon fibers, ceramic fibers, inorganic fibers, metal filaments or mixtures thereof. The fibrous material preferably has a length of about 2 to about 30 nanometers and a diameter of about 10 to about 100 microns, most preferably a length of about 2 to about 30 nanometers and a length of about 10 to about 100 microns. Fiber cross-sections need not be circular and fibers need not be straight. If fibrillated fibers are used, the diameters of the individual fibrils can be much smaller than the aforementioned fiber diameters. However, as the fracture fluid/fiber/proppant mixture enters the formation, the proppant and fiber will concentrate due to fluid leak-off. At higher concentrations the fiber greatly increases the slurry's propensity to bridge. When the fiber concentration is increased to about 4 to about 5 weight per cent by leak-off, the slurry has an appearance of wet pulp. It has been shown in the laboratory and in yard tests that about 4 to about 5 per cent synthetic organic polymer fiber in the liquid can plug a slot 6 to 12 millimeters wide. Therefore, as the fiber and proppant are concentrated in the fracture due to fluid leak-off, the slurry will have a great propensity for the proppant/fiber mixture to bridge and cause a screenout.

The amount of synthetic organic polymer fiber is preferably adjusted over the range from about 0.5 to about 2 weight per cent to account for variations in fluid efficiency. Normally, 0.5 weight percent synthetic organic polymer fiber would not be considered high and would not cause a screenout. However, one object of the Invention is to use a fiber concentration that would result in a screenout. In some cases, for example if the fluid leak-off coefficient is relatively high, and the fluid efficiency low, then the initial fiber concentration could be reduced to about that amount. The concentration might then be in the "normal" range for a "normal" treatment, but it would be high for the treatment in question. On the other hand, if the fluid efficiency were to be unusually high, then the initial fiber concentration should be increased beyond the typical 2 per cent to induce a tip screenout. Thus the range of synthetic organic polymer fiber concentration of the Invention is from about 0.5 weight per cent of the liquid to about 3 weight per cent, preferably from about 1 weight per cent to about 2 weight per cent. In this context, by "high concentration" we mean a concentration of a specific fiber, in a specific liquid/fiber/proppant combination, high enough to very significantly increase the probability of a screenout under the conditions of the treatment.

Although in conventional hydraulic fracturing the amount of fiber used is normally determined by the amount of proppant used, so that the amount of fiber is changed if the amount of proppant is changed in different stages, in the fluids and methods of this Invention the amount of fiber used is more commonly determined by the amount of liquid used and it is more common to use a constant amount of fiber by weight of liquid.

As fiber stiffness or rigidity increases, so does the propensity to initiate bridging and screenout. However, fluid handling will become more difficult as stiffness increases. Fibers of varying stiffness or rigidity are readily available commercially. Furthermore, friction pressure during pumping often decreases due to the addition of fibers. This is an added benefit particularly in combined fracturing/gravel packing operations where the fluid is often pumped through small ports and passages. The choice of fiber can readily be made by one of ordinary skill in the art by considering the various advantages and disadvantages of different fibers as regards to cost, availability, concentration needed, ease of handling, effect on friction pressure and other factors.

Although we have referred to "tip screenouts" it would be within the scope of the Invention to generate a desired length of conventional fracture with conventional treatment parameters and then induce screenout by beginning addition of filter cake degradation agent and/or filter cake degradation agent aid at high concentration and/or by increasing the fiber concentration. Fiber may also be added to the pad, in amounts comparable to the amounts added to proppant-laden stages. Although fracturing followed by gravel packing is more commonly performed with a screen in place, it is within the scope of the Invention to apply the fluids and methods to treatments that are done without a screen. Although we have described the Invention in terms of hydrocarbon production, it is within the scope of the Invention to use the fluids and methods in wells intended for the production of other fluids such as water or brine, and in injection, production, or storage wells. Although we have described the Invention in terms of unfoamed fluids, fluids foamed or energized (for example with nitrogen, carbon dioxide or mixtures thereof) may be used; adjustment to the fiber concentration due to any consequent changes in the fluid properties or proppant concentration would be made. It is also to be understood that the fluids and methods of the Invention may be used to cause tip screenouts in multiple fractures, natural fractures, or wormholes or the like created by treatment with acid. Any of the methods of the Invention can be carried out with coiled tubing.

Any proppant (gravel) can be used, provided that it is compatible with the filter cake degradation agent and the bridging-promoting materials if the latter are used, the formation, the fluid, and the desired results of the treatment. Such proppants (gravels) can be natural or synthetic, coated, or contain chemicals; more than one can be used sequentially or in mixtures of different sizes or different materials. Proppants and gravels in the same or different wells or treatments can be the same material and/or the same size as one another and the term "proppant" is intended to include gravel in this discussion. In general the proppant used will have an average particle size of from about 10 to about 100 U. S. mesh, more particularly, but not limited to 40/60, 20/40, 16/20, 12/20 and 8/20 sized materials. Normally the proppant will be present in the slurry in a concentration of from about 1 PPA to about 25 PPA, preferably from about 1 to about 12 PPA. (PPA is "pounds proppant added" per gallon of liquid.)

Any additives normally used in such treatments may be included, again provided that they are compatible with the other components and the desired results of the treatment. Such additives can include, but are not limited to anti-oxidants, crosslinkers, corrosion inhibitors, delay agents, biocides, buffers, fluid loss additives, etc. The wellbores treated can be vertical, deviated or horizontal. They can be completed with casing and perforations or open hole.

A further advantage to the fluids and methods of the Invention is that they give the operator an additional parameter to adjust, that is they afford additional flexibility in designing a treatment that will screen out. Thus in situations in which the operator may not wish to decrease the pad volume, slow the pumps, decrease the proppant loading, or make other design changes, he may add fiber or increase the fiber content. Thus, in the practice of the Invention, it is preferred to design the treatment so that screenout would probably occur even without the addition of high fiber concentrations early in the treatment, and then to add high fiber concentrations early in the treatment in addition to ensure a screenout, but it is equally within the scope of the Invention to design a treatment that probably will not screen out without the addition of high fiber concentrations early in the treatment, and then to add high fiber concentrations early in the treatment. It is also within the scope of this Invention to design and start pumping a treatment that is not designed or expected to screen out at any point during the treatment and then during the treatment to decide to cause the treatment to screen out and therefore at that point to begin addition of a high fiber concentration or to increase a low fiber concentration to a high fiber concentration and cause the screenout (which would not be a tip screenout).

In gravel packing, or combined fracturing and gravel packing, it is within the scope of the Invention to apply the fluids and methods to treatments that are done with or without a screen. Although we have described the Invention in terms of hydrocarbon production, it is within the scope of the Invention to use the fluids and methods in wells intended for the production of other fluids such as carbon dioxide, water or brine, or in injection wells. Although we have described the Invention in terms of unfoamed fluids, fluids foamed or energized (for example with nitrogen or carbon dioxide or mixtures thereof) may be used. Adjustment of the appropriate concentrations due to any changes in the fluid properties or proppant concentration consequent to foaming would be made. It is also to be understood that the fluids and methods of the Invention may be used to cause tip screenouts in multiple fractures or natural fractures.

It should be pointed out that although it is not desirable for the screenout to occur in the wellbore, in the annulus between a screen (if present) and the wellbore face, or in the perforations, it is desirable that these regions be fully packed at the end of the job. That is, the desired result is to screen off in the fracture (the origination of the screenout is in the fracture) and then to fill (or "pack") the above-mentioned regions with proppant/gravel.

Any proppant (gravel) can be used, provided that it is compatible with the fiber, the formation, the fluid, and the desired results of the treatment. Such proppants (gravels) can be natural or synthetic, coated (for example by resin), or contain chemicals; more than one can be used sequentially or in mixtures of different sizes or different materials. By proppant we mean any particulate material selected for a particular purpose such as propping a fracture to keep it open or gravel packing a completion to prevent or minimize production of formation fines. Proppants and gravels in the same or different wells or treatments can be the same material and/or the same size as one another. Such materials are usually called proppants when they are placed in fractures and gravel when they are placed in perforations and wellbores, but the term "proppant" is intended to include gravel in this discussion. In general the proppant used will have an average particle size of from about 10 to about 100 U. S. mesh, more particularly, but not limited to 40/60, 20/40, 16/20, 12/20 and 8/20 sized materials. Normally the proppant will be present in the slurry in a concentration of from about 1 PPA to about 25 PPA, preferably from about 1 to about 16 PPA.

Any additives normally used in the pads and proppant-laden stages of such treatments may be included, again provided that they are compatible with the other components and the desired results of the treatment. Such additives can include, but are not limited to anti-oxidants, crosslinkers, corrosion inhibitors, delay agents, biocides and buffers. The wellbores treated can be vertical, deviated or horizontal. They can be completed with casing and perforations or openhole, and with or without screens.

Examples of breakers suitable for use in the method of the present Invention include but are not limited to enzymes such as galactomannanase (for breaking polysaccharides based on galactomannan), enzymes such as alpha-amylase for breaking starches, cellulase and hemi-cellulase for breaking celluloses, and oxidizers such as persulfates, bromates, iodates, permanganates, percarbonates, perchlorates, perborates, hypochlorite, chlorine dioxide, and chlorate (for breaking polymers by oxidation). Additionally, the breakers can be encapsulated to delay their release, as is well known in the art. Encapsulation is advantageous because most or all of the polymer to be broken will be in the filtercake and, with encapsulation, that is where the breaker will be late in the job. If the breaker is not encapsulated, at least some of it will leak off and not be in contact with the polymer in the filtercake, although some may flow back into contact with the polymer when the fracture pressure is released. Encapsulation may also be advantageous because a breaker can be chosen that will break both the polymer and the micelles in the VES if a VES is used. Encapsulation is also advantageous for the delayed reaction it provides. Different breakers are more efficient at different conditions (especially temperature) and for different viscosifiers, as is well known in the art.

Breaker aids (or breaker activators) serve as catalysts to increase the breaker activity and performance, especially at lower bottomhole temperatures. Examples are certain tertiary amines, or mixtures of certain tertiary amines, that are aids for oxidizing breakers, as described in U.S. Pat. No. 4,560,486.

It should be understood that breakers and breaker aids may also be included in job designs for the purpose of degrading the viscosifying agent in the carrier fluid. These breakers and breaker aids may be the same as or different from the those included for the purpose of degrading the filter cake. Degradation of the viscosifying agent must occur after degradation of the filter cake, that is the carrier fluid must be capable of transporting proppant until the treatment has been completed. The choice of breakers, and breaker aids, and the timing and concentration of the addition of these and of acid or solvent must be selected accordingly. For example, a slow acting breaker that is insufficiently active to degrade the filter cake during the job but sufficiently active to degrade the viscosifying agent within an acceptable time after pumping has ceased may be added at any point during a job, independent of addition of a filter cake degradation agent or agents or aids. As another example, a breaker aid may be included in the injected fluid during the time in which the filter cake is being laid down so that it is incorporated in the filter cake; a breaker for the viscosifying agent and for the filter cake is added later in the treatment and because of the breaker aid in the filter cake, the filter cake is degraded more rapidly than is the viscosifying agent.

This Invention may be practiced at any formation temperature, taking into account any cool-down that may occur, at which the pad and fracture fluids and their components, in particular the polymer in the pad and the VES and micelles in the fracture fluid, have the needed properties, in particular stability.

EXAMPLE 1

1.5 in. diameter cores were saturated in a test brine (2 gallons per thousand gallons of a 50 per cent solution of tetra methyl ammonium chloride) prior to dynamic fluid loss tests. The dynamic fluid loss apparatus consists of a core holder designed so that fluids can be flowed across one end face of the core (the front end) in such a way that some of the fluid will leak off into the core, and fluids can be injected into the other end (the back end) of the core to measure core permeability; the system is controlled by automation software. Brine was injected into the back end of the core to measure the initial permeability. Dynamic fluid loss was performed by flowing a borate crosslinked guar fluid (at a 20 lb. guar/1000 gallons of fracturing fluid concentration) across the face of the core for 30 minutes at a differential pressure of about 500 psi. (This results in some flow of fluid into the core, and formation of a filter cake on the core face if there is a filter cake forming material in the fluid.) An automated fracture simulator controlled the injection rate to simulate the shear rate during an actual treatment. The fracture treatment parameters that the dynamic fluid loss experiments were designed to mimic are listed in Table 1. Following dynamic leak-off, the regained permeability was measured by again injecting the same brine into the back end of the core.

TABLE 1

| Parameter | Treatment value |
| --- | --- |
| Injection Rate | 15 bpm |
| Injection Time | 30 min |
| Power Law Exponent (n') | 0.7 |
| Fracture Height | 65 ft |
| Fracture Length | 75 ft |
| Fracture Width (At Wellbore) | 0.75 in |
| Distance From Wellbore | 1 ft |

Figure 2:
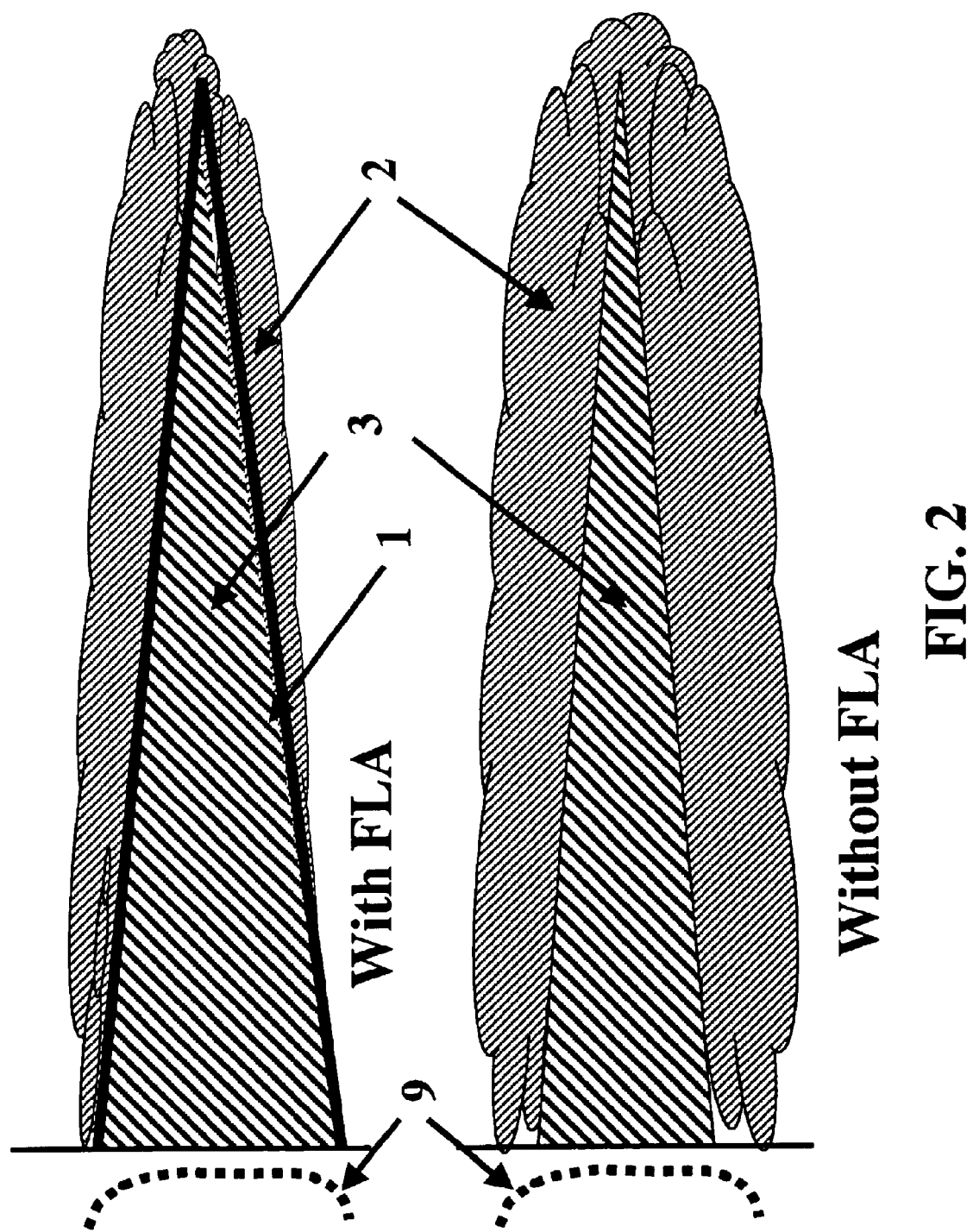
FIG. 2 is a schematic of the depth of penetration of leaked-off fluid into a formation with and without a leak-off additive.

The experiments were done at 52° C. Table 2 shows comparisons of laboratory results of dynamic leak-off tests simulating fractures with and without an FLA (the FLA concentration was 30 lbs. of fluid loss additive per 1000 gallons of fracturing fluid); this FLA is a mixture of starch and particulate platelets. The data show the effects of the FLA on permeability, leak-off and depth of penetration of leaked-off fluid into the rock. The data show that fluid loss, both spurt (the amount of leak-off before a filter cake is formed) and the leak-off after the filter cake was formed, was much smaller, final permeability was much greater, and matrix penetration depths by fluid were much smaller when the FLA was used. These results show how a good FLA will prevent or delay screenout. The results of tests 2 and 4 are shown graphically in FIG. 1. Such data would be used in the design of the methods of the Invention. FIG. 2 (not to scale) demonstrates schematically how the presence or absence of a filtercake affects the extent to which fluid leaks off from the fracture into the rock matrix. In FIG. 2, a filter cake [1] is formed by the FLA in the upper schematic, but not in the lower, which represents a case in which FLA was not used or was removed. Consequently, without the filter cake, there is more leaked off fluid [2] from the propped fracture [3]. A sand control screen is shown as [9]; the wellbore and gravel are not shown.

TABLE 2

| Run | Initial Perm. (mD) | Final Perm. (mD) | Spurt (gal/100 ft$^2$) | Leak-off after Spurt (gal/100 ft$^2$) | Penetration Depth (inches) |
| --- | --- | --- | --- | --- | --- |
| | | | (Without FLA) | | |
| 1 | 98 | 38 | 146 | 72 | 25 |
| 2 | 80 | 10 | 123 | 58 | 21 |
| | | | (With FLA) | | |
| 3 | 80 | 47 | 46 | 19 | 8 |
| 4 | 75 | 35 | 60 | 17 | 10 |

EXAMPLE 2

Figure 3:
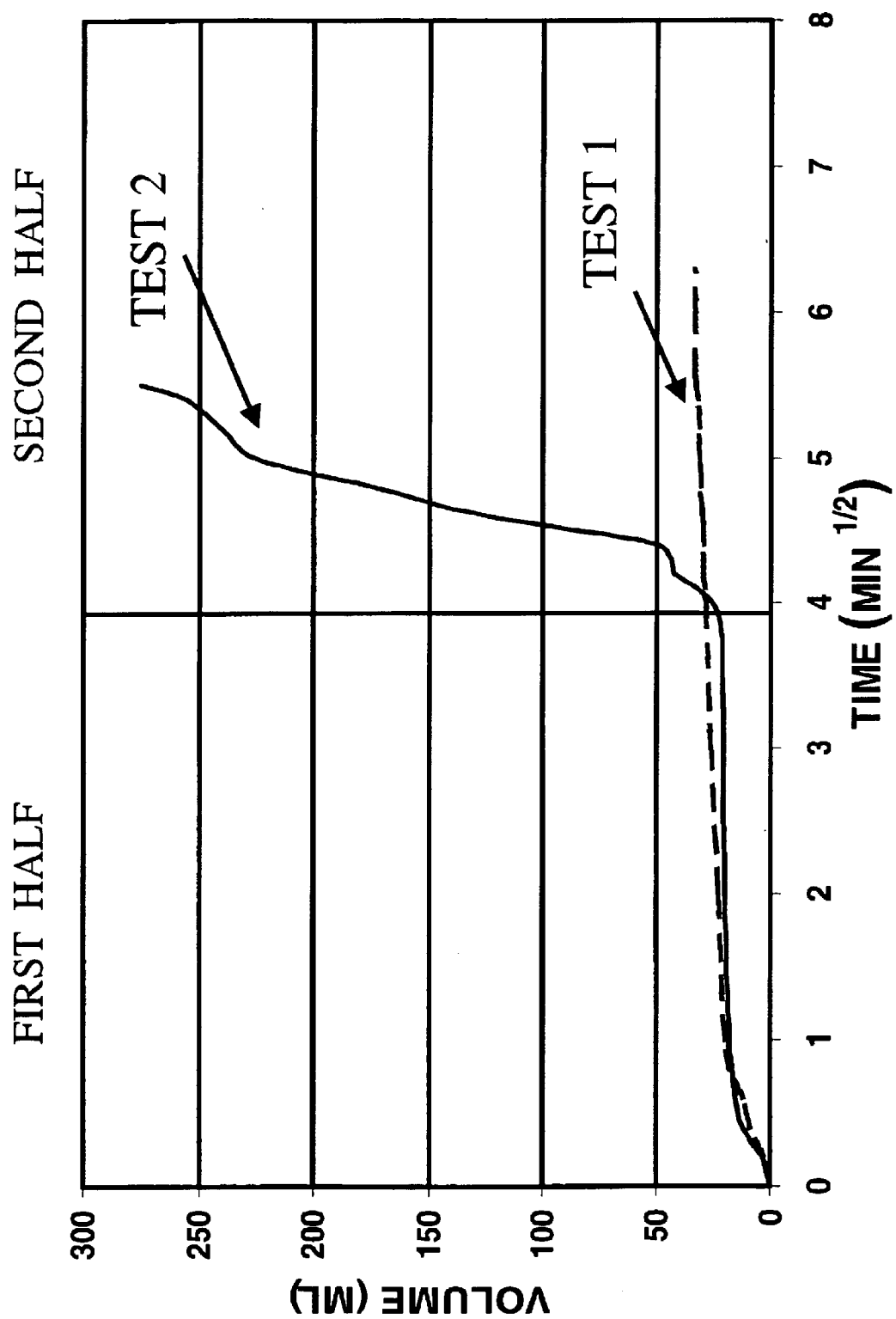
FIG. 3 shows dynamic fluid loss volume and fluid viscosity vs. a time function in experiments with two different combinations of FLA, filter cake degradation agents, and a filter cake degradation agent aid.
Figure 4:
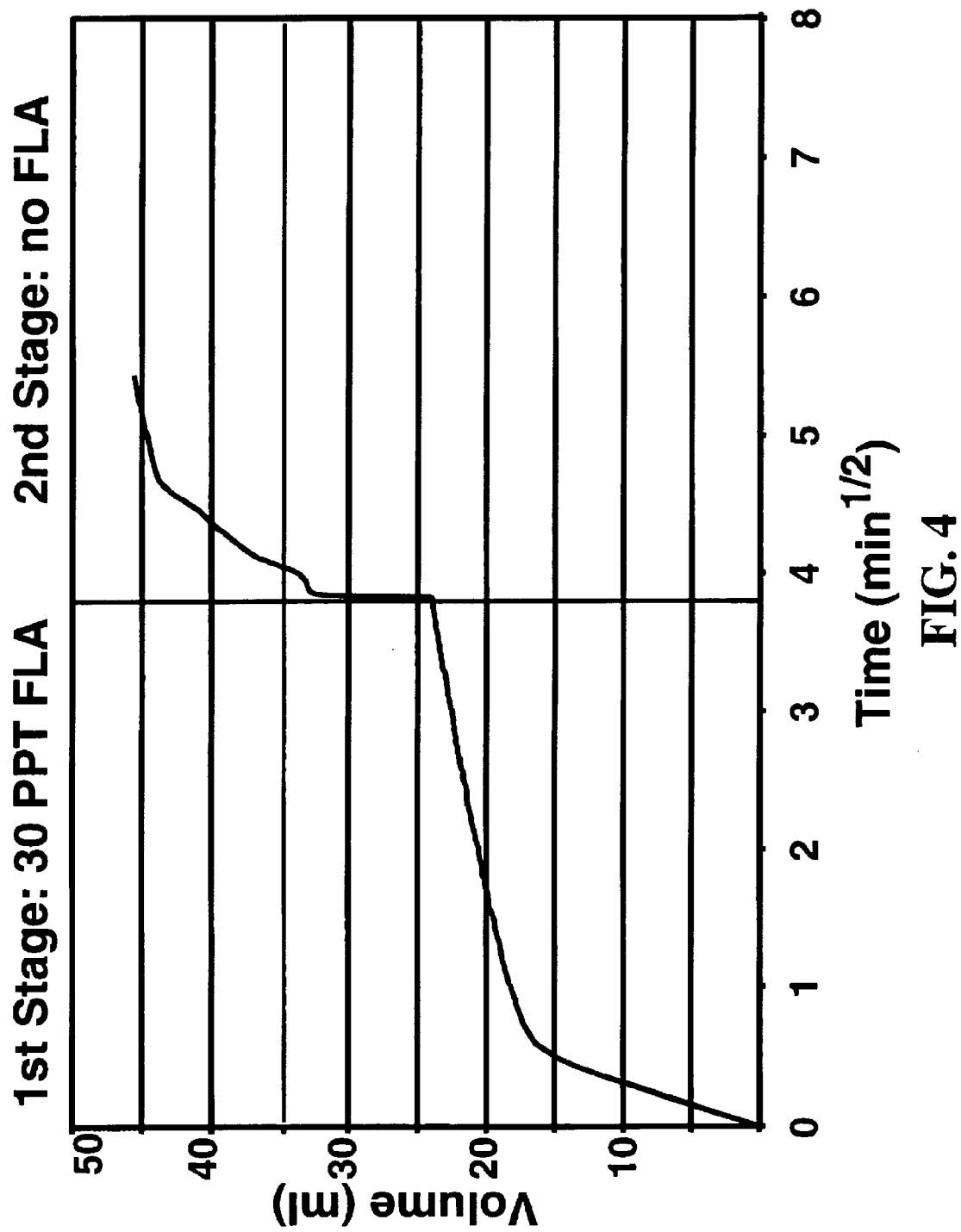
FIG. 4 shows dynamic fluid loss volume and fluid viscosity vs. a time function in an experiment in which addition of FLA is stopped and there is no filter cake degradation agent or filter cake degradation agent aid.

FIG. 3 shows laboratory experiments demonstrating a method of the Invention using two FLA breaker (filter cake degradation agent) stages. These are dynamic fluid loss test runs at 52° C. by the same method as Example 1. It can be seen that in test one when the first half contained an FLA and a first breaker and a breaker aid (filter cake degradation agent aid) for a second breaker that was present in the second half, and there was still FLA in the second half, there was no increase in fluid loss in the second half. In test two, when the first half was like the first half of test one but the second half contained no FLA, there was a dramatic increase in the volume of fluid lost in the second half, indicating that the filter cake had been severely damaged. In a fracture, this would translate into bridging and/or reduced fluid efficiency and a TSO. To ensure that the result was not due solely to the exclusion of the FLA from the second half of test 2, another laboratory test was run (see FIG. 4) in which there was no breaker or breaker aid in either stage, but the first stage included the FLA and the second stage did not. FIG. 4 shows that in this case there was a slight increase in flow in the second stage, but it was very minor compared to the results shown in the tests in FIG. 3. This makes it clear that the major factor was the breakers and especially the inclusion in the first stage of a breaker aid for the breaker in the second stage and that leaving the FLA out of the second stage was of low importance. The first stage of these experiments represents either the pad or the pad plus the early proppant stages of a commercial stimulation treatment; the second stage of these experiments represents the late proppant stages of a commercial stimulation treatment.

EXAMPLE 3

Figure 5:
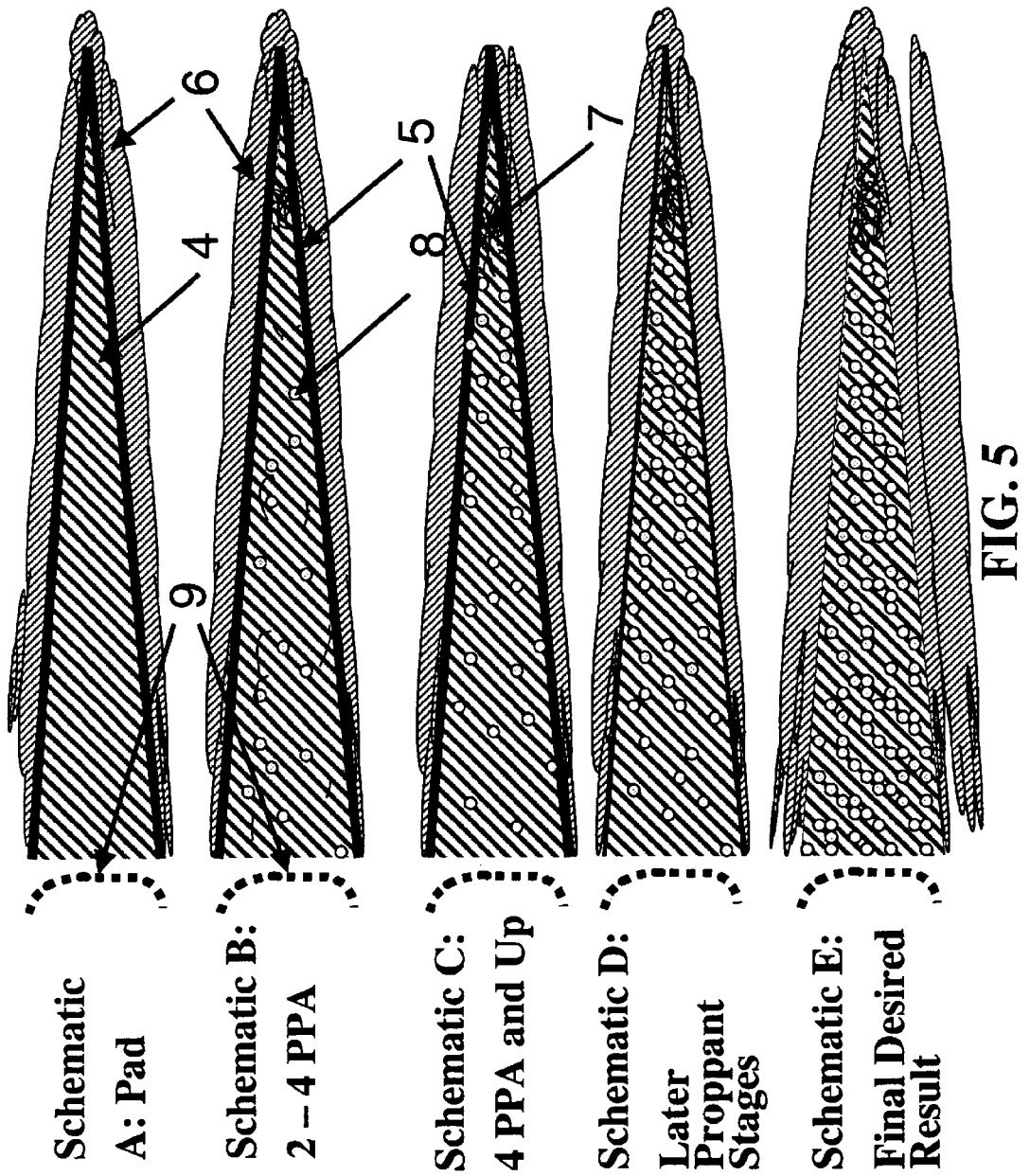
FIG. 5 is a schematic showing the effect on fracture generation of adding an FLA, fiber, filter cake degradation agents, and a filter cake degradation agent aid.

FIG. 5 demonstrates the effect of adding fiber to promote bridging in addition to adding an FLA and breakers. The figure shows a particular embodiment in which a filter cake with a built-in breaker is created with the pad, then fibers are added to the proppant stage to promote bridging, and then another breaker is added to the later proppant stages. (Schematics A through E of the contents of the fracture are shown from top to bottom as the stimulation progresses; these could be either top views or side views and are not to scale and the fractures are not necessarily the same size in successive schematics.) This sequence stops the fracture growth and then removes the filter cake, which ultimately increases the flow rate, into the fracture, of the fluid to be produced. The viscosifier in the pad, the first filter cake degradation agent, the filter cake degradation agent aid for the second filter cake degradation agent, and the FLA are the same as those in the first half of test 2 of FIG. 2; the viscosifier in the carrier fluid is the same as in the pad, and the second filter cake degradation agent is the same as the one in the second half of test 2 in FIG. 2. In FIG. 5, "2–4 PPA" means the stages containing 2 to 4 pounds of proppant per pound of fluid ("pounds proppant added" or PPA) and "4 PPA and Up" means the stages from 4 PPA to the last proppant-containing stage plus a flush.

The viscosified pad contains the first filter cake degradation agent, the filter cake degradation agent aid for the second filter cake degradation agent, and the FLA. As the pad is pumped (schematic A) and is at the leading edge of the growing fracture [4], a filter cake [5] is built for fluid loss control and some fluid leaks off [6] into the formation rock. Enough pad must be pumped for the filter cake to form. In the 2–4 PPA stages (schematic B), the carrier fluid contains a synthetic organic polymeric fiber [7] added to each proppant [8] stage at a concentration of about 0.6 volume per cent of the liquid in the slurry that arrests the fracture length growth. A sand control screen is shown as [9]: the wellbore and gravel are not shown. In subsequent stages (schematic C) the second filter cake degradation agent is introduced and begins to degrade the filter cake, aided by the filter cake degradation agent aid (that is already present ) for the second filter cake degradation agent. During pumping of the late proppant-laden stages (schematic D) the second filter cake degradation agent degrades the filter cake, causing increasingly greater leak-off. The final result (schematic E) is a relatively short, wide fracture that has screened off when and where desired, has little or no filter cake, and is well-packed with proppant. Many variations on this scheme, for example but not limited to exactly when and how much of each of the FLA, the first filter cake degradation agent, the filter cake degradation agent aid for the second filter cake degradation agent, the second filter cake degradation agent, and the fiber are added are within the scope of the Invention. Other variations may include adding the above materials in different orders or in different combinations.

EXAMPLE 4

Three fracturing scenarios were simulated with FracCADE™ (Schlumberger proprietary fracture design, prediction and treatment-monitoring software). In these scenarios, the same FLA, and when present the same first filter cake degradation agent, filter cake degradation agent aid for the second filter cake degradation agent, second filter cake degradation agent, and fiber as in Example 3 were used. FLA was added in all three scenarios at a rate designed to form a filter cake of 2 pounds of FLA per one hundred square feet of fracture surface. The job design is shown in Table 3. The pump rate was 15 barrels per minute throughout; the pad and the proppant-laden stages were viscosified with a boron-crosslinked 20 pounds per thousand gallons guar in sea water; the flush contained the same guar at the same concentration in sea water, but uncrosslinked.

TABLE 3

| Stage | Fluid gallons | Pounds Proppant | Barrels Slurry | Minutes Pumping |
|---|---|---|---|---|
| PAD | 5500 | 0 | 131 | 8.7 |
| 0.5 PPA | 1000 | 500 | 24.3 | 1.6 |
| 1.0 PPA | 1000 | 1000 | 24.9 | 1.7 |
| 2.0 PPA | 1000 | 2000 | 26.0 | 1.7 |
| 4.0 PPA | 1000 | 4000 | 28.1 | 1.9 |
| 6.0 PPA | 1000 | 6000 | 30.3 | 2.0 |
| 8.0 PPA | 1000 | 8000 | 32.4 | 2.2 |
| 10.0 PPA | 1500 | 15000 | 51.9 | 3.5 |
| 12.0 PPA | 3000 | 36000 | 110.2 | 7.3 |
| FLUSH | 3286 | 0 | 78.2 | 5.2 |

In scenarios 1 and 2, no filter cake degradation agents or filter cake degradation agent aids were used. In scenario 2, fiber was added to the 2 to 4 PPA stages at a rate of 0.8 weight per cent of the proppant. In scenario 3 the pad included a first filter cake degradation agent and a filter cake degradation agent aid for a second filter cake degradation agent, and the proppant-laden stages starting with 2 PPA contained the second filter cake degradation agent. The results of the three simulations are shown in Table 4.

TABLE 4

| Scenario: | 1 | 2 | 3 |
|---|---|---|---|
| FLA in Pad? | Yes | Yes | Yes |
| Filter Cake Degradation Agents and Aid Used? | No | No | Yes |
| Pad Spurt (gal/100 ft$^2$) | 0 | 0 | 46 |
| Fiber in 2–4 PPA Stages? | No | Yes | No |
| Proppant Stages Spurt (gal/100 ft$^2$) | 0 | 0 | 99 |
| Final Propped Fracture Half Length | 55.3 | 45.4 | 36.9 |
| Final Propped Fracture Width at Wellbore | 1.298 | 1.729 | 3.052 |

Note that the design included sufficient pumping time to ensure filter cake formation. Amounts of pad, fracture fluid, fracture fluid viscosifier, breaker (filter cake degradation agent), breaker aid (filter cake degradation agent aid), fluid loss control additive, and proppant typical of commercial treatments were used. It can be seen from scenario 1 that when an FLA was used but no means for destroying the filter cake was employed, a long narrow fracture was produced. When fiber was added to promote a tip screenout in scenario 2, a shorter, wider fracture was created. When filter cake degradation was used to promote the tip screenout, the shortest, widest fracture was created. A good job design would be a combination of scenarios 2 and 3.

The preceding description of specific embodiments of the present Invention is not intended to be a complete list of every possible embodiment of the Invention. Persons skilled in this field will recognize that modifications can be made to the specific embodiments described here that would be within the scope of the present Invention.

We claim:

1. A method of causing a screenout in a subterranean formation stimulation treatment, comprising injecting a slurry of a proppant in a carrier fluid, comprising a thickening amount of a viscoelastic surfactant, above fracturing pressure to create one or more fractures, comprising:
   a) injecting a proppant-free pad fluid, comprising a viscosifying agent and a fluid loss additive, that forms a filter cake, and
   b) degrading the filter cake with a filter cake degradation agent while injecting a slurry of a proppant in the carrier fluid.

2. The method of claim 1 wherein the filter cake comprises the viscosifying agent in the pad fluid.

3. The method of claim 2 wherein the viscosifying agent in the pad fluid is selected from the group consisting of water-soluble polymers and crosslinked water-soluble polymers.

4. The method of claim 1 wherein the fluid loss additive is selected from the group consisting of water-soluble polymers, crosslinked water-soluble polymers, asbestos, starch, calcium carbonate, mica, plastic particles, solid wax, wax-polymer particles, insoluble salts, slowly soluble salts, and mixtures thereof, provided that at least one component can be broken or dissolved.

5. The method of claim 1 wherein the filter cake degradation agent is selected from the group consisting of oxidizers, enzymes, acids and mixtures thereof.

6. The method of claim 1 wherein a sand control screen is in place before the treatment.

7. The method of claim 6 further comprising the step of gravel packing at least a portion of the wellbore in the producing formation.

8. The method of claim 1 further comprising the step of gravel packing at least a portion of the wellbore in the producing formation.

9. A method of causing a screenout in a subterranean formation stimulation treatment, comprising injecting a slurry of a proppant in a carrier fluid above fracturing pressure to create one or more fractures, comprising the steps of:
   a) injecting a proppant-free pad fluid that forms a filter cake,
   b) injecting one or more first slurry stages comprising a proppant portion and a non-proppant portion comprising a carrier fluid; and
   c) degrading the filter cake with a filter cake degradation agent while injecting one or more second slurry stages comprising a proppant portion and a non-proppant portion comprising a carrier fluid,
wherein the composition of the non-proppant portion of the one or more first slurry stages differs from the composition of the non-proppant portion of the one or more second slurry stages.

10. The method of claim 9 wherein the pad fluid comprises a member of the group consisting of fluid loss additives, filter cake degradation agents, filter cake degradation agent aids, and mixtures thereof, provided that no filter cake degradation agent aid is included for a filter cake degradation agent that is included.

11. The method of claim 10 wherein the one or more first slurry stages comprise a member of the group consisting of fluid loss additives, filter cake degradation agents, filter cake degradation agent aids, and mixtures thereof, provided that no filter cake degradation agent aid is included for a filter cake degradation agent that is included or was in the pad.

12. The method of claim 10 wherein the one or more second slurry stages comprise a member of the group consisting of filter cake degradation agents, filter cake degradation agent aids, and mixtures thereof.

13. The method of claim 11 wherein the one or more second slurry stages comprise a member of the group consisting of filter cake degradation agents, filter cake degradation agent aids, and mixtures thereof.

14. The method of claim 13 wherein the pad fluid and the one or more first slurry stages each comprise a fluid loss additive, a first filter cake degradation agent and a filter cake degradation agent aid for a second filter cake degradation agent that is more active under treatment conditions than is the first filter cake degradation agent; and the one or more second slurry stages contain the second filter cake degradation agent.

15. The method of claim 14 wherein the filter cake comprises a polymer subject to enzymatic and oxidative degradation under treatment conditions; the first filter cake degradation agent is present in the pad and comprises an enzyme that degrades the polymer; the second filter cake degrading agent is present in the one or more second slurry stages and comprises an oxidizing compound that degrades the polymer; and the second filter cake degradation agent aid for the second filter cake degradation agent is present in the pad fluid, the one or more first slurry stages, and the one or more second slurry stages and comprises a tertiary amine.

16. The method of claim 13 wherein the filter cake comprises an acid-soluble solid particulate compound and the second filter cake degrading agent is present in the one or more second slurry stage and comprises an acid capable of dissolving at least part of the acid-soluble solid particulate compound under treatment conditions.

17. The method of claim 13 wherein one more of the pad fluid, the one or more first slurry stages, and the one or more second slurry stages comprise a bridging-promoting material.

18. The method of claim 17 wherein the pad fluid comprises a bridging-promoting material.

19. The method of claim 17 wherein the pad fluid and the one or more first slurry stages comprise a bridging-promoting material.

20. The method of claim 17 wherein the pad fluid, the one or more first slurry stages, and the one or more second slurry stages comprise a bridging-promoting material.

21. The method of claim 17 wherein the one or more first slurry stages comprise a bridging-promoting material.

22. The method of claim 17 wherein the one or more first slurry stages, and the one or more second slurry stages comprise a bridging-promoting material.

23. The method of claim 17 wherein the one or more second slurry stages comprise a bridging-promoting material.

24. The method of claim 17 wherein a sand control screen is in place before the treatment.

25. The method of claim 24 further comprising the step of gravel packing at least a portion of the wellbore in the producing formation.

26. The method of claim 17 further comprising the step of gravel packing at least a portion of the wellbore in the producing formation.

27. The method of claim 9 wherein the one or more first slurry stages comprise a member of the group consisting of fluid loss additives, filter cake degradation agents, filter cake degradation agent aids, and mixtures thereof, provided that no filter cake degradation agent aid is included for a filter cake degradation agent that is included or was in the pad.

28. The method of claim 27 wherein the one or more second slurry stages comprise a member of the group consisting of filter cake degradation agents, filter cake degradation agent aids, and mixtures thereof.

29. The method of claim 9 wherein the one or more second slurry stages comprise a member of the group consisting of filter cake degradation agents, filter cake degradation agent aids, and mixtures thereof.

30. The method of claim 9 wherein one or more of the pad fluid, the one or more first slurry stages, and the one or more second slurry stages comprise a member of the group consisting of fluid loss additives, filter cake degradation agents, filter cake degradation agent aids, bridging-promoting materials, and mixtures thereof.

31. The method of claim 9 wherein a sand control screen is in place before the treatment.

32. The method of claim 31 further comprising the step of gravel packing at least a portion of the wellbore in the producing formation.

33. The method of claim 9 further comprising the step of gravel packing at least a portion of the wellbore in the producing formation.

* * * * *